United States Patent [19]

Humphreys

[11] Patent Number: 5,333,415

[45] Date of Patent: Aug. 2, 1994

[54] PROCESS FOR SEALING A PERFORATED WEB MATERIAL

[75] Inventor: Bryan E. Humphreys, Heads Nook, England

[73] Assignee: Aerospace Systems & Technologies Ltd., Durham, England

[21] Appl. No.: 841,975

[22] Filed: Feb. 25, 1992

[30] Foreign Application Priority Data

Mar. 1, 1991 [GB] United Kingdom ............ 9104298.6

[51] Int. Cl.$^5$ ............................................. B24B 1/00
[52] U.S. Cl. .................... 51/281 R; 51/310; 51/322; 51/324; 51/326; 29/423
[58] Field of Search .............. 51/281 R, 310, 311, 51/317–322, 324, 326, 327; 408/1 R; 409/131; 29/423, 424, 527.2, 551, 898.1

[56] References Cited

U.S. PATENT DOCUMENTS

| | | |
|---|---|---|
| 2,663,928 | 12/1953 | Wheeler . |
| 3,076,916 | 2/1963 | Kopplus . |
| 3,308,530 | 3/1967 | Levi . |
| 3,465,481 | 9/1969 | Szwarcman . |
| 3,875,777 | 4/1975 | Kelley ..................... 29/424 |
| 3,890,818 | 6/1975 | de Charsonville et al. .......... 29/424 |
| 4,250,610 | 2/1981 | Wilbers et al. ......................... 29/424 |

FOREIGN PATENT DOCUMENTS

| | | |
|---|---|---|
| 1039345 | 9/1958 | Fed. Rep. of Germany . |
| 51-040307 | 4/1976 | Japan . |
| 1131004 | 5/1989 | Japan . |
| WO7900821 | 10/1979 | PCT Int'l Appl. . |
| 2236699 | 4/1991 | United Kingdom . |

*Primary Examiner*—M. Rachuba
*Attorney, Agent, or Firm*—Rodman & Rodman

[57] ABSTRACT

A process for the mechanical treatment of porous sheet materials entails introducing a particulate material into the pores of the sheet material to block the pores, carrying out the mechanical treatment, and then removing the particles from the pores. The process enables porous sheet materials to be subjected to mechanical operations, for example shaping under gaseous pressure or surface polishing, which could otherwise only be applied to non-porous materials.

9 Claims, 1 Drawing Sheet

PROCESS FOR SEALING A PERFORATED WEB MATERIAL

The present invention is concerned with the mechanical treatment, for example shaping or abrading, of porous sheet materials.

Many situations exist in which the mechanical treatment of a porous sheet material is rendered difficult, unsatisfactory or impossible by the presence of the pores in the material. For example, if it is desired to shape the material under fluid pressure or vacuum, it may be impossible to establish or maintain the necessary pressure because of the porous nature of the sheet material. As a further example, when a porous surface is subjected to mechanical cleaning or polishing, the pores may collapse or become blocked during that treatment and as a result the porosity of the material is changed.

These difficulties may be illustrated by reference to the aircraft industry. Thus it may be required to produce a shaped component comprising a porous sheet metal to form part of an aircraft wing. One approach to the manufacture of shaped components in, say, titanium is to heat a flat sheet of that metal to a temperature in the region of its plastic point and then to shape the metal sheet under gas pressure. However, when the component is required to be porous in order to influence the air flow over the surface of the wing, drilling of the component after forming in order to produce the desired perforations is an unsatisfactory operation from several standpoints. For example, applying the drills to the shaped component requires complicated manipulation of the component and also may make it impossible to form holes which taper towards a smaller diameter at the outer surface of the component. However, if the sheet is perforated while still in its original flat condition, then it may be impossible subsequently to establish the gas pressure necessary to shape the sheet.

Also in the aircraft and other industries, it may be important to maintain a high quality surface on a porous material. However the presence of the pores makes cleaning of such material difficult or unsatisfactory. In particular mechanical cleaning processes such as planing, milling, sanding or polishing tend to smear the debris and cause partial or complete blocking of the holes.

It is an object of the present invention to provide a process whereby at least some of the foregoing difficulties are reduced or overcome and by means of which porous sheet materials may satisfactorily be subjected to mechanical treatment such as shaping or mechanical cleaning.

The process according to the present invention, for the mechanical treatment of a porous sheet material, comprises introducing into the pores of said material a multiplicity of particles of a particulate material which is inert with respect of the sheet material, whereby to block the pores, carrying out the desired mechanical treatment of the sheet material, and subsequently removing the particles from the pores.

Thus, by virtue of the present invention, the porous sheet material is rendered temporarily non-porous to enable the mechanical treatment to be carried out and is thereafter restored to its original porous condition.

The process according to the invention may be applied to a wide range of porous sheet materials but is of particular value in its application to metals and alloys. Thus it may be used in the mechanical treatment of metal or alloy sheets which have been rendered porous by drilling or by perforating the sheet in some other way, for example perforated sheets of titanium, stainless steel or aluminium. It may also be used in the mechanical treatment of soft metals or alloys which have been formed with an inherently porous structure, for example sintered products such as sintered bronze.

The size of the pores in the porous sheet material may be selected over a fairly wide range, which is determined largely by the use to which the sheet material is to be put. In practice, the lower limit of pore size may be determined by what is mechanically achievable, while the upper limit is likely to be determined by said proposed use. By way of example, the pore diameter may advantageously lie within the range from 20 to 200 micrometers, preferably from 25 to 75 micrometers. When the porous sheet material has been produced by perforating an unperforated sheet, as an alternative to forming the perforations by drilling they may be formed by a laser or electron beam perforation process.

The particulate material by means of which the pores are blocked must be inert with respect to the porous sheet material but in other respects may have various characteristics. If the subsequent mechanical treatment of the porous material involves an operation at elevated temperature, then the particulate material should be selected so as to withstand the elevated temperature. For example, if the treatment involves shaping the sheet at a temperature above its plastic point, the particulate material should be selected to withstand that treatment. In one form of the invention, the particulate material is one which is soluble in a solvent by means of which it may subsequently be dissolved out from the pores of the porous material.

In one preferred form of the present invention, the particulate material is an oxide or an oxide precursor such as a carbonate. Among these compounds, the preferred particulate material is a metal oxide or a mixture of metal oxides. Oxides which are particularly preferred when the mechanical treatment is a high-temperature treatment such as plastic forming of a metal or alloy include yttrium oxide, magnesium oxide, silica and alumina, of which the first two are preferred. When the mechanical treatment is a polishing or abrasive treatment, the particulate material may for example be one of these foregoing compounds or a calcium compound.

The dimensions of the particles in the particulate material should be selected to take account of the dimensions of the pores in the porous sheet material. Thus some at least of the particles should have a maximum dimension which exceeds the maximum diameter of the pores. Very preferably, the particles in the particulate material will comprise a range of sizes, especially a graduated range of which the largest may have a size which is a multiple of the size (for example 10 to 50 times the size) of the smallest.

The particulate material may be introduced into the pores of the porous material in various ways. For example, the particles may be blown in a gas or conveyed into the pores suspended in a liquid. As an alternative, the particulate material may be applied to the porous surface as a paste or a cement.

Preferably the particulate material is admixed with a quantity of a binder before it is introduced to the pores.

As discussed above, the specific type of mechanical treatment to which the invention is applied is a matter of choice. The treatment may be any mechanical handling of the porous sheet material which could be and is conventionally applied to a non-porous sheet material. However, as also indicated above, the invention is of particular value when the treatment is one which is rendered difficult, unsatisfactory or impossible by the presence of pores in the material being treated. Such treatments are in particular shaping treatments under fluid pressure and planing, milling, sanding and polishing treatments of the surface of the material.

After the mechanical treatment of the porous material, the particles are removed from the pores. This removal may be achieved by means of a chemical reaction which attacks and dissolves the particulate material, or simple dissolution in a suitable solvent, or by a mechanical method. For example, especially where the pores are tapered and the particles are retained in place by the tapering, the particles may be blown back out through the wider end of the pores. In addition or as an alternative, removal of the particles may be assisted or effected by means of untrasonic vibration of the sheet material. As a further alternative, appropriate particulate materials may be removed by heating to temperatures at which they are decomposed.

In a particularly preferred form of the invention, the particulate material is removed by dissolving it in an acid, especially an inorganic acid or mixture of acids. Particularly suitable inorganic acids for this purpose are hydrochloric acid, sulphuric acid and mixtures of these two acids. Nitric acid may be used if it does not attack the porous sheet material but is less preferred.

An example of a metal treatment process to which the present invention may be applied is illustrated by means of the accompanying drawings, wherein.

Figure 1:
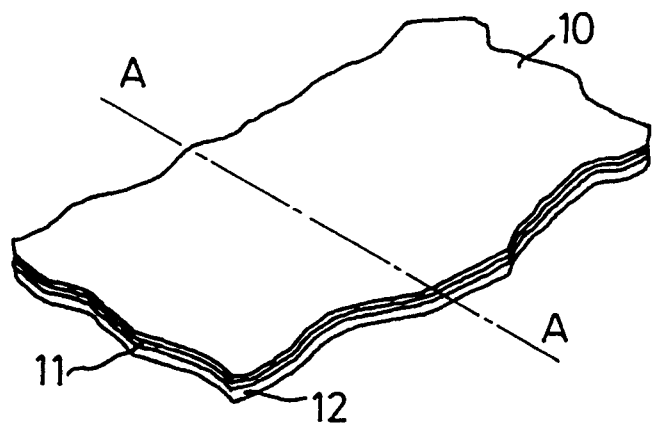
FIG. 1 is a perspective view of a metal structure before treatment.
Figure 2:
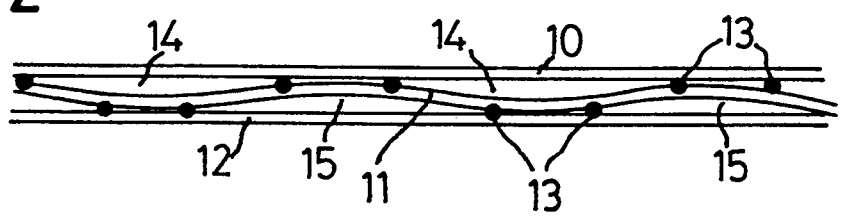
FIG. 2 is a cross-sectional view along the line A—A of FIG. 1.

The structure illustrated in FIGS. 1 and 2 comprises three sheets, 10, 11 and 12, of titanium metal. The sheet 10 will eventually form the outer layer of the shaped structure and is perforated. Between the outer sheet 10 and an unperforated inner sheet 12 is sandwiched an intermediate sheet 11, welded to the sheets 10 and 12 along the lines indicated by the reference numeral 13.

By means of a particulate material conveyed by air into voids 14 between the intermediate sheet 11 and the perforated outer sheet 12, the pores exposed to those voids are blocked to enable the shaping treatment to be undertaken.

Figure 3:
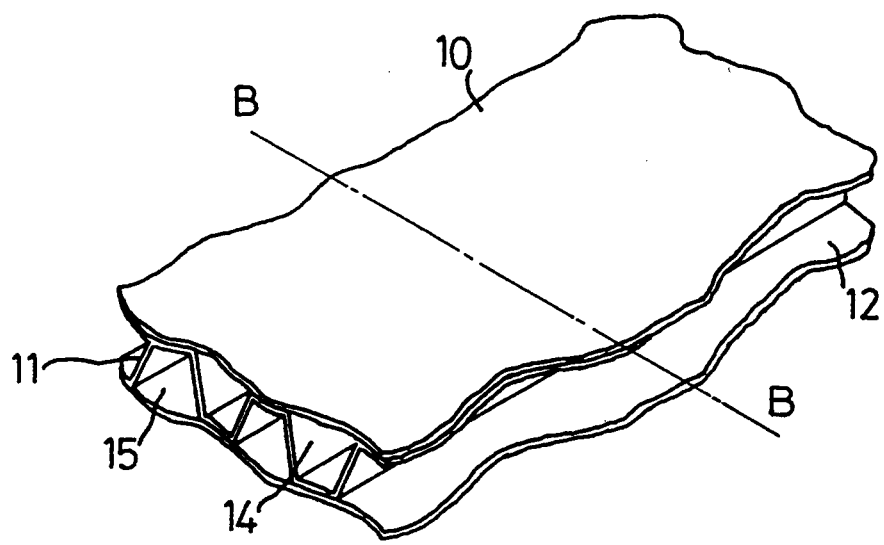
FIG. 3 shows the metal structure of FIG. 1 after treatment.
Figure 4:
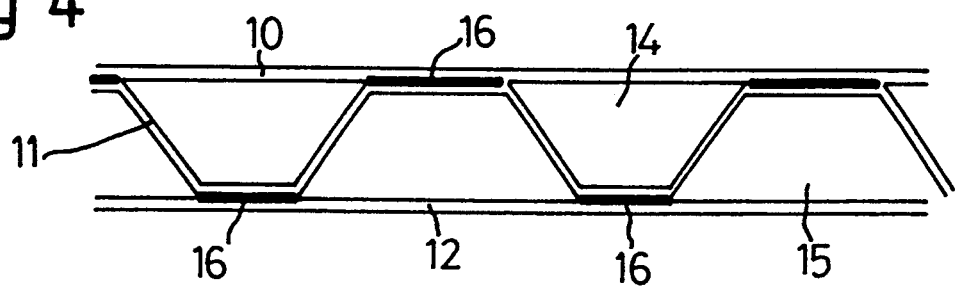
FIG. 4 is a cross-sectional view along the line B—B of FIG. 3.

The structure is now heated to a temperature above the plastic point of the titanium and air under pressure is introduced into the voids 14 and similar voids 15 between the intermediate sheet 11 and the inner sheet 12. The structure is in this way shaped to the form illustrated in FIGS. 3 and 4, which is a strong panel suitable for use in aircraft construction. In the course of the shaping operation, the intermediate sheet 11 becomes secured to the outer and inner sheets 10 and 12 by diffusion bonding in the areas indicated by the reference numeral 16.

When the blocked pores are now cleared again by removal of the particles by the selected method, air fed to the voids 14 in the shaped structure (such as an aircraft wing) is able to escape through the pores and thereby influence the air flow over the wing surface in operation.

The invention is further illustrated, by way of example only, by the following Example of the process according to the invention.

EXAMPLE

A titanium sheet approximately one millimeter in thickness was perforated by a large number of pores which tapered from a diameter of approximately 120 micrometers at one surface thereof (the "inner" surface) to a diameter of approximately 50 micrometers at its outer surface. To enable the sheet to be shaped, a particulate material was introduced into the pores in an air stream applied to the inner surface of the sheet, until the pores were blocked and the sheet enabled to sustain gaseous pressure on its inner face. The particulate material comprised a 50:50 mixture of yttrium oxide and magnesium oxide particles, of which the particle sizes ranged from 150 micrometers down to 5 micrometers, together with a small amount of a binder.

When the pores had been blocked in this way, the now-nonporous sheet was heated to a temperature of the order of 925° C. and shaped under gaseous pressure to the desired shape. When the shaping operation had been completed, the shaped structure was cooled and then the particles were removed from the pores by dissolving in hydrochloric acid.

I claim:

1. A process for shaping a porous sheet of a metal selected from the group comprising titanium and stainless steel, which process comprises blocking the pores of said porous sheet with a particulate material selected from the group comprising yttrium oxide and magnesium oxide, shaping said sheet by heating it and applying a gaseous pressure thereto, and thereafter removing the particulate material by dissolving it in acid, whereby to unblock said pores.

2. A process according to claim 1, wherein said acid is selected from the group comprising hydrochloric acid, sulphuric acid and mixtures of these acids.

3. A process according to claim 2, wherein the particulate material is introduced to the pores by means of a gas or liquid.

4. A process according to claim 2, wherein the particulate material is applied to the surface of said porous sheet as a paste or a cement.

5. A process for shaping a porous sheet of titanium wherein the diameter of the pores lies within the range from 20 to 200 micrometers, which process comprises blocking said pores with a particulate oxide material selected from the group comprising the oxides of yttrium and magnesium, shaping said sheet by heating it and applying a gaseous pressure thereto, and thereafter unblocking said pores by dissolving said oxide material in an inorganic acid.

6. A process according to claim 5, wherein said particulate oxide material comprises particles of a range of different sizes.

7. A process for the mechanical treatment of a porous sheet metal or metal alloy, comprising introducing into the pores of said porous sheet metal or metal alloy a particulate material which is inert with respect to said metal or metal alloy, whereby to block the pores, shaping said sheet by applying a gaseous pressure thereto, and thereafter removing the particulate material from said pores by dissolving it in a liquid comprising at least one acid.

8. A process for the mechanical treatment of porous sheet metal or metal alloy, comprising blocking the pores of said material with at least one particulate material which is an oxide selected from the group consisting of the oxides of yttrium, magnesium, silicon and aluminum, applying to a surface of said porous sheet at least one mechanical treatment selected from the group consisting of planing, milling, sanding and polishing treatments, and thereafter removing said particulate material from said pores by the application of ultrasonic vibrations to the sheet material.

9. A process for the mechanical treatment of porous sheet metal or metal alloy, comprising blocking the pores of said material with a particulate material which is an oxide selected from the group consisting of the oxides of yttrium, magnesium, silicon and aluminum, applying to a surface of said porous sheet at least one mechanical treatment selected from the group consisting of planing, milling, sanding and polishing treatments, and thereafter removing said particulate material from said pores by heating it to a temperature at which it decomposes.

* * * * *